United States Patent Office 3,058,993
Patented Oct. 16, 1962

3,058,993
SELECTED POLYFLUORINATED CYCLIC SULFONES AND PREPARATION THEREOF
Rudolph A. Carboni and James C. Kauer, Wilmington, Del., assignors to E. I. du Pont de Nemours and Company, Wilmington, Del., a corporation of Delaware
No Drawing. Filed July 26, 1960, Ser. No. 45,305
12 Claims. (Cl. 260—327)

This invention relates to, and has as particular objects provision of, certain novel polyfluorinated cyclic sulfones and methods for the preparation of the same.

In spite of the continuously increasing scientific and technical interest in fluorine-containing organic compounds, there are no reports in the literature of fluorine-substituted cyclic sulfones, i.e., sulfones in which the sulfur atom of the sulfone group is a member of a heterocyclic ring. Such compounds appear to be wholly unknown.

The new compounds made available by this invention are the cyclic sulfones of the general formula

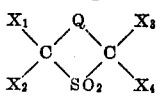

where $X_1$ and $X_3$ are fluorine, chlorine or perhaloalkyl groups and $X_2$ and $X_4$ are fluorine or perhaloalkyl groups, said perhaloalkyl groups being perfluoroalkyl or ω-chloroperfluoroalkyl groups, and Q is sulfur or a perfluorothiaalkylene group.

The terms used above and in the discussion which follows have their usual meaning. Thus, a perfluoroalkyl radical is an alkyl radical containing only carbon and fluorine atoms, and an ω-chloroperfluoroalkyl radical is an alkyl radical containing only carbon, fluorine and one chlorine atom, this chlorine atom being at the end of the chain, and a perfluorothiaalkylene radical is a perfluoroalkylene radical in which an intrachain difluoromethylene radical, i.e., a —$CF_2$— group, is replaced by a divalent sulfur atom.

The polyfluorinated cyclic perhalosulfones of this invention are prepared by oxidation of the polyfluorinated cyclic perhalosulfides of the formula

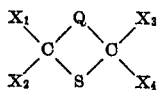

where the symbols $X_1$–$X_4$ and Q have the previously stated significance. An especially effective oxidizing agent for this purpose is a mixture of chromium trioxide and fuming nitric acid, as will be described in more detail below.

It is a remarkable and unexpected fact that only one of the sulfur atoms of the polyfluorinated cyclic disulfides is oxidized to a sulfone group, the other one remaining unaffected. Is is also unexpected to find that there is no detectable formation of sulfoxide, >S=O, groups.

The polyfluorinated cyclic sulfides which serve as starting materials for the polyfluorinated cyclic sulfones of this invention include the following classes of compounds:
(1) Perfluoro-1,4-dithiane,

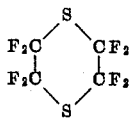

prepared by reacting tetrafluoroethylene with sulfur, as described in U.S. Patent 2,931,803, and (2) the polyfluorinated 1,3-dithietanes, the synthesis of which is described in several copending U.S. patent applications as-signed to the assignee of the present application. The last-mentioned class of compounds comprises:

(a) The perfluoro- or chlorofluoro-1,3-dithietanes such as

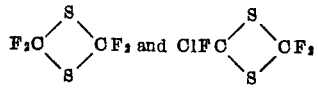

prepared by fluorination of tetrachloro-1,3-dithietane (thiophosgene dimer) with antimony trifluoride, preferably in excess and in a solvent such as tetramethylene sulfone, at 90–200° C., or with hydrogen fluoride in the presence of antimony trifluoride or another fluorine carrier.

(b) The 2,4-bis(perfluoroalkyl or ω-chloroperfluoroalkyl) - 2,4 - dichloro-1,3-dithietanes. These compounds, which are dimers of fluorothioacyl chlorides, are prepared by ultraviolet light irradiation, preferably in a chlorofluorocarbon solvent, of the fluorothioacyl chlorides of the formula

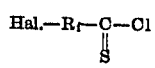

where Hal. is fluorine or chlorine and $R_f$ is a perfluoroalkylene radical. The fluorothioacyl chlorides themselves may be prepared by reaction with the vapors of boiling sulfur of a fluorochloroalkane Hal.—$R_f$—$CCl_3$ or of a chlorofluoroalkylmercury compound

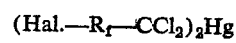

where Hal. and $R_f$ have the previously indicated significance.

Examples of cyclic perhalosulfides of this class are

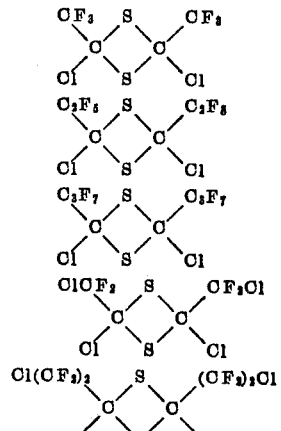

and (c) The 2,4-bis(perfluoroalkyl or ω-chloroperfluoroalkyl)-2,4-difluoro-1,3-dithietanes. These compounds are prepared by ultraviolet light irradiation, preferably in a perhalocarbon solvent, of the perfluoro- or ω-chloroperfluorothioacyl fluorides. The latter may be prepared by fluorination with antimony trifluoride of the perhalothioacyl chlorides mentioned under (b) above.

Examples of cyclic perhalosulfides of this are

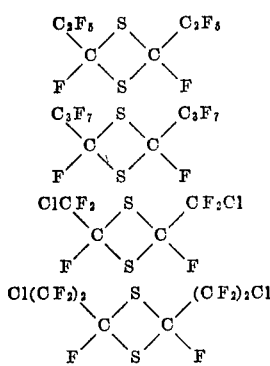

and

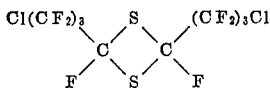

(d) The tetrakis(perfluoroalkyl or ω-chloroperfluoroalkyl)-1,3-dithietanes. These compounds are either described in the literature or can be prepared by spontaneous dimerization, preferably in the presence of a Lewis base such as dimethylformamide or a hydrocarbon ether, of the corresponding perhalothioketone. The latter may be prepared by heating the perhaloketones with phosphorus pentasulfide at 200–300° C., or by reacting molten sulfur at 400–650° C. with a perfluoroolefin of at least three carbon atoms in accordance with the equation

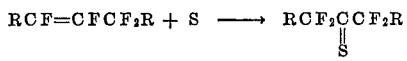

Examples of cyclic perhalosulfides of this class are:

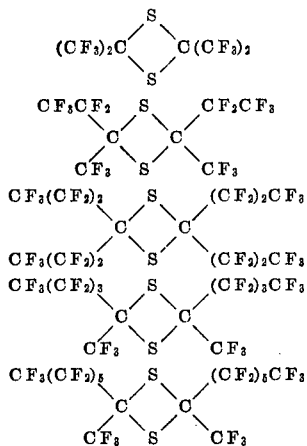

and

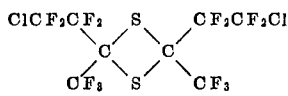

The preferred starting materials for use in this invention are the polyfluorinated cyclic sulfides having the formula previously set forth wherein Q is sulfur or the 2-thia-1,1,3,3-tetrafluorotrimethylene radical

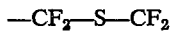

$X_1$ and $X_3$ are fluorine or chlorine atoms or perfluoroalkyl or ω-chloroperfluoroalkyl groups of 1 to 6 carbon atoms; and $X_2$ and $X_4$ are fluorine atoms or perfluoroalkyl or ω-chloroperfluoroalkyl groups of 1 to 6 carbon atoms.

The sulfones of this invention are prepared by bringing the polyfluorinated cyclic sulfide in intimate contact with a mixture of chromium trioxide and yellow fuming nitric acid, that is, nitric acid of specific gravity, $d_4^{20}$, about 1.46–1.51, whereby oxidation to the sulfone takes place. The relative proportions of oxidizing agent and cyclic sulfide are not critical, since they affect only the yield of oxidation product. For efficient utilization of the starting material, it is desirable to use at least one mole, and preferably from 1.25 to 6 moles, of chromium trioxide per mole of cyclic sulfide. The nitric acid is desirably used in a molar ratio (as $HNO_3$) between 4:1 and 10:1 with respect to the chromium trioxide. These amounts are, however, only to be taken as the preferred ones for economical operation, since the oxidation takes place also when using smaller or larger quantities of the oxidizing mixture.

Since the cyclic perhalosulfides differ in their ability to undergo oxidation, the appropriate reaction temperature will necessarily vary. With the more reactive sulfides, oxidation takes place at temperatures of the order of 15° C. or even lower. Other sulfides require elevated temperatures, although it is in general unnecessary to exceed 200° C. A generally suitable temperature range is that between 20 and 150° C. Depending upon the reaction temperature and the volatility of the cyclic sulfide, the oxidation can be conducted in open vessels, i.e., at atmospheric pressure, or in closed vessels. Stirring facilitates contact between the reactants and is recommended, though not essential. Oxidation proceeds to a substantial extent within a few minutes at reaction temperature with the more reactive sulfides, and it is in general unnecessary to prolong the reaction period beyond 4–16 hours.

The polyfluorinated cyclic sulfones so obtained, which are liquids or relatively low-melting solids, are most conveniently separated from the reaction mixture by pouring the latter into water, which dissolves the inorganic materials but not the sulfone. The sulfone can then be isolated by filtration if it is a solid, or by decantation and/or extraction with a suitable solvent if it is a liquid, or by a combination of such methods. The sulfone can be purified, if necessary, by any conventional method such as fractional distillation, sublimation or crystallization.

The invention is illustrated in greater detail by the following examples.

*Example I*

To a stirred mixture of 25 g. of chromium trioxide and 60 ml. of yellow fuming nitric acid (sp. gr. 1.47) was added 13 g. of perfluoro-1,4-dithiane. The mixture was heated with stirring at 70° C. for 24 hours, cooled and poured into 5 volumes of ice water. The waxy solid which separated was filtered, washed with cold water and pressed dry on filter paper. This product, which was unexpectedly found to be extremely volatile, was purified by sublimation at 100° C., collecting the sublimate on a cold finger. There was thus obtained a waxy solid, M.P. 61.5–63.8° C., which upon further purification by careful distillation through a packed column boils at 116.6° C. at 764 mm. and melts at 65.5–66.3° C. This product was shown by elemental analysis to have the composition of perfluoro-1,1-dioxo-1,4-dithiane,

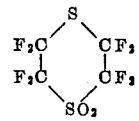

*Analysis.*—Calc'd for $C_4F_8O_2S_2$: C, 16.22; F, 51.38; S, 21.64; mol. wt., 296. Found: C, 15.97; F, 51.28; S, 21.62; mol. wt., 288.

The assigned structure is supported by the fact that the product does not liberate bromine from 48% hydrobromic acid on heating at 100° C. in sealed tube, and is not reduced by zinc/acetic acid. Both treatments are known to bring about reduction of sulfoxide groups, and their failure indicates the absence of such groups. The presence of an intense absorption peak in the infrared spectrum at 1430 cm.$^{-1}$ confirmed the presence of a negatively substituted sulfone group in the molecule [Quart. Rev. 13, 237 (1959)].

*Example II*

A mixture of 91 g. of 2,2,4,4-tetrakis(trifluoromethyl)-1,3-dithietane, 150 ml. of yellow fuming nitric acid and 60 g. of chromium trioxide was heated at reflux (about 70° C.) for 15 hours. The reaction mixture was then poured over 250 g. of crushed ice, and the solid that separated was collected on a filter under nitrogen pressure, washed with water and recrystallized from methanol. After drying, there was obtained 80.1 g. of 1,1-dioxo-2,2,4,4-tetrakis(trifluoromethyl)-1,3-dithietane,

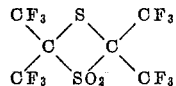

as large colorless prisms, M.P. 35° C., $n_D^{40}$ 1.3438.

*Analysis.*—Calc'd for $C_6F_{12}O_2S_2$: C, 18.19; F, 57.54; S, 16.11. Found: C, 17.91; F, 57.82; S, 16.38.

A very strong infrared absorption peak at 1440 cm.$^{-1}$ verified the presence of a sulfone group.

The cyclic sulfide used as the starting material in this example may be prepared as follows:

Perfluoropropanethione, 2.4 ml., was placed in a flask and cooled to −80° C. A solution of three drops of N,N-dimethylformamide in 5 ml. of diethyl ether was added. The blue color of the perfluoropropanethione faded instantly and a white crystalline precipitate formed in a few minutes. The mixture was allowed to warm to room temperature and then distilled. There was obtained 2.1 g. of 2,2,4,4-tetrakis(trifluoromethyl)-1,3-dithietane as a colorless liquid boiling at 109–111° C.

The perfluoropropanethione can be prepared by introducing in a platinum tube heated at 432–625° C. a mixture of hexafluoropropene (84 g.) and molten sulfur (26 ml.) over a period of 1.5 hours. The volatile reaction product was condensed in a trap at −80° C. Distillation of this condensate from the trap at 1 mm. pressure gave the deep blue perfluoropropanethione.

*Example III*

A mixture of 118.8 g. of 2,4-bis(chlorodifluoromethyl)-2,4-difluoro-1,3-dithietane (cis and trans isomers), 96 g. of chromium trioxide and 240 ml. of yellow fuming nitric acid was stirred and heated to reflux (about 70° C.) for 18 hours. The reaction mixture was cooled and filtered and the filtrate was poured over 500 g. of crushed ice. The lower organic layer was separated, washed with water, dried over calcium chloride and distilled under reduced pressure. There was obtained 99.4 g. of 1,1-dioxo - 2,4 - bis(chlorodifluoromethyl) - 2,4-difluoro-1,3-dithietane,

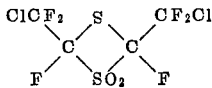

as a colorless liquid, B.P. 50.5° C. at 8 mm. pressure, $n_D^{24.5}$ 1.4169. The fluorine nuclear magnetic resonance spectrum indicated this product to be a mixture of the cis and trans isomers in approximately equal amounts. A very strong infrared absorption peak at 1417 cm.$^{-1}$ verified the presence of a sulfone group.

*Analysis.*—Calc'd for $C_4Cl_2F_6O_2S_2$: C, 14.60; Cl, 21.55; F, 34.64; S, 19.50. Found: C, 14.84; Cl, 21.49; F, 34.54; S, 19.52.

The cyclic sulfide used as the starting material in this example may be prepared as follows:

A solution of 38 g. of chlorodifluorothioacetyl fluoride [prepared according to J. Gen. Chem. USSR—Eng. Tr. 27, 2301 (1957)] in 25 ml. of dichlorodifluoromethane in a quartz reaction vessel was irradiated at reflux temperature with ultraviolet light for 3 hours. The dichlorodifluoromethane was evaporated and the residue was distilled under reduced pressure. There was obtained 31.3 g. of 2,4-bis(chlorodifluoromethyl)-2,4-difluoro-1,3-dithietane as a colorless oil, B.P. 44° C. at 23 mm. pressure, $n_D^{24}$ 1.4131.

*Analysis.*—Calc'd for $C_4Cl_2F_6S_2$: C, 16.17; Cl, 23.87; F, 38.24; S, 21.58. Found: C, 16.68; Cl, 23.84; F, 38.34; S, 21.88.

*Example IV*

To a stirred mixture of 500 g. of chromium trioxide and 1300 ml. of yellow fuming nitric acid cooled in an ice bath was added gradually 480 g. of chlorotrifluoro-1,3-dithietane at such a rate that the temperature of the reaction mixture did not rise above 30° C. The addition required about 2 hours. The cool reaction mixture was then poured over twice its volume of crushed ice and the lower organic layer was separated, washed with water, dried over magnesium sulfate and distilled under reduced pressure. There was obtained 340 g. of 1,1-dioxo-2-chloro-2,4,4-trifluoro-1,3-dithietane,

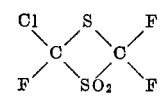

as a colorless liquid, B.P. 69° C. at 60 mm. pressure, $n_D^{24.3}$ 1.4527.

*Analysis.*—Calc'd for $C_2ClF_3O_2S_2$: C, 11.30; F, 26.81; S, 30.16. Found: C, 11.69; F, 26.81; S, 30.32.

The assigned structure was supported by the infrared and nuclear magnetic resonance spectra, indicating the presence of a sulfone group.

The cyclic sulfide serving as starting material in this example may be prepared as described below following Example V.

*Example V*

To a vigorously stirred mixture of 200 ml. of nitric acid (sp. gr. 1.5) and 75 g. of chromium trioxide heated to gentle reflux was added 100 g. of 2,2,4,4-tetrafluoro-1,3-dithietane over a period of 4 hours, during which time the temperature ranged from 60° to 85° C. The mixture was cooled and poured onto crushed ice, and the solid which separated was washed with water at 0° C. and the water was removed by filtration. The reaction product was then allowed to melt, dried over magnesium sulfate and distilled. There was obtained 46 g. of 1,1-dioxo-2,2,4,4-tetrafluoro-1,3-dithietane,

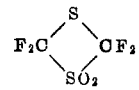

as a liquid boiling at 104–105° C., $n_D^{25}$ 1.4108, density 1.79 g./ml. at 25° C.

*Analysis.*—Calc'd for $C_2F_4O_2S_2$: F, 38.75; S, 32.70. Found: F, 39.23; S, 32.53.

An infrared absorption peak at 1406 cm.$^{-1}$ confirmed the presence of a sulfone group.

The cyclic sulfides used in this example and in Example IV may be prepared by fluorination of thiophosgene dimer (tetrachloro-1,3-dithietane) as follows:

A mixture of 108 g. (0.47 mole) of 2,2,4,4-tetrachloro-1,3-dithietane, 179 g. (1.0 mole) of antimony trifluoride and 250 ml. of tetramethylene sulfone was stirred and heated at 90–100° C. for 2 hours. The volatile reaction products were condensed in a trap cooled with ice. There was obtained 66 g. of condensate which was distilled through a spinning band column to give 45.62 g. (60% yield) of 2,2,4,4-tetrafluoro-1,3-dithietane as a very light yellow liquid, B.P. 47–48° C., M.P. −8° C., $n_D^6$ 1.4028.

*Analysis.*—Calc'd for $C_2F_4S_2$: C, 14.63; F, 46.30; S, 39.06. Found: C, 15.21; F, 46.95; S, 39.16.

There was also obtained as a higher boiling fraction 5.72 g. of chlorotrifluoro-1,3-dithietane, B.P. 89–90° C., $n_D^6$ 1.4615.

*Analysis.*—Calc'd for $C_2ClF_3S_2$: Cl, 19.63; S, 35.50. Found: Cl, 19.68; S, 35.62.

A third reaction product isolated from the reaction mixture was thiophosgene (7.83 g.), B.P. 73–76° C., $n_D^6$ 1.5904.

Other examples of polyfluorinated cyclic sulfones which can be obtained by oxidizing the corresponding polyfluorinated cyclic sulfides in accordance with the above-described general procedure are: 1,1-dioxo-2,4-dichloro-2,4-bis(trifluoromethyl)-1,3-dithietane; 1,1-dioxo-2,4-dichloro-2,4-bis(perfluoroethyl)-1,3-dithietane; 1,1-dioxo-2,4-dichloro-2,4-bis(perfluoropropyl) - 1,3 - dithietane; 1,1-dioxo - 2,4 - dichloro-2,4-bis(ω-chloroperfluoroethyl)-1,3-dithietane; 1,1-dioxo-2,4-dichloro-2,4-bis(ω-chloroperfluorobutyl) - 1,3-dithietane; 1,1-dioxo-2,4-difluoro-2,4-bis(trifluoromethyl)-1,3-dithietane; 1,1-dioxo - 2,4-difluoro-2,4-bis(perfluoroethyl)-1,3-dithietane; 1,1-dioxo-2,4-difluoro-2,4-bis(perfluoropropyl) - 1,3 - dithietane; 1,1-dioxo-2,4-dichloro-2,4-bis(ω - chloroperfluoropropyl) - 1,3-dithietane; 1,1-dioxo-2,2,4,4,-tetrakis(perfluoropropyl)-1,3-dithietane; 1,1-dioxo-2,4-bis(trifluoromethyl)-2,4-bis(perfluorobutyl) - 1,3-dithietane; 1,1-dioxo-2,4-bis(perfluorobutyl)-1,3-dithietane; 1,1-dioxo-2,4-bis(trifluoromethyl)-2,4-bis(perfluorohexyl)-1,3-dithietane; and 1,1-dioxo-2,4-bis(trifluoromethyl) - 2,4-bis(ω-chloroperfluoroethyl)-1,3-dithietane.

The most readily accessible, and therefore preferred, products of this invention are the polyfluorinated cyclic sulfones corresponding to the formula

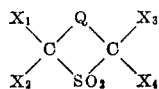

wherein Q is sulfur or the 2-thia-1,1,3,3-tetrafluorotrimethylene radical —$CF_2$—S—$CF_2$—; $X_1$ and $X_3$ are fluorine or chlorine atoms or perfluoroalkyl or ω-chloroperfluoroalkyl radicals of 1 to 6 carbon atoms; and $X_2$ and $X_4$ are fluorine atoms or perfluoroalkyl or ω-chloroperfluoroalkyl radicals of 1 to 6 carbon atoms.

The polyfluorinated cyclic sulfones of this invention are nonflammable and do not support combustion, and they are generically useful as fire-retarding and fire-extinguishing agents. This property was demonstrated by soaking a wad of cotton in xylene and igniting it. When the 1,1 - dioxo - 2 - chloro - 2,4,4 - trifluoro - 1,3-dithietane of Example IV was sprayed on the burning wad, the fire was extinguished immediately. In a similar test, the solid perfluoro-1,1-dioxo-1,4-dithiane of Example I was sprinkled on the burning cotton, whereupon it melted and extinguished the flame. In the same test again, a few drops of the 1,1 - dioxo - 2,2,4,4-tetrafluoro-1,3-dithietane of Example V were sprayed on the flaming wad, whose rate of burning was at once very substantially decreased. Thus, the polyfluorinated cyclic sulfones can be used as the fire extinguishing chemical in fire-fighting equipment, or to impregnate porous combustible materials for safety purposes.

The polyfluorinated cyclic sulfones are further generically useful as solvents or plasticizers for highly halogenated polymers. With those sulfones which are liquids at or near ordinary temperature, the solutions so obtained can be used to impregnate porous materials such as textiles, paper, wood, brick, etc. and to coat non-porous materials such as metals. For example, a solution containing about 1% by weight of low molecular weight polytetrafluoroethylene (M.P. 83–105° C.) in 1,1-dioxo-2-chloro-2,4,4-trifluoro-1,3-dithietane was prepared by gently heating a mixture of the two ingredients. The solution was cooled and filtered and the filtrate was coated on a piece of filter paper. The water repellency of the treated paper was greatly improved in comparison with an untreated control.

Since obvious modifications and equivalents in the invention will be evident to those skilled in the chemical arts, we propose to be bound solely by the appended claims.

The embodiments of the invention in which an exclusive property or privilege is claimed are defined as follows:

1. Compounds of the formula

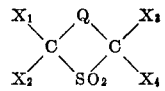

wherein $X_1$ and $X_3$ are selected from the group consisting of fluorine, chlorine, and ω-chloroperfluoroalkyl and perfluoroalkyl of 1–6 carbons and $X_2$ and $X_4$ are selected from the group consisting of fluorine and ω-chloroperfluoroalkyl and perfluoroalkyl of 1–6 carbons, and Q is selected from the group consisting of sulfur and 2-thia-1,1,3,3-tetrafluorotrimethylene.

2. Perfluoro-1,1-dioxo-1,4-dithiane.

3. 1,1-dioxo-2,2,4,4-tetrakis(trifluoromethyl) - 1,3 - dithietane.

4. 1,1-dioxo-2,4-bis(chlorodifluoromethyl)-2,4-difluoro-1,3-dithietane.

5. 1,1-dioxo-2-chloro-2,4,4-trifluoro-1,3-dithietane.

6. 1,1-dioxo-2,2,4,4-tetrafluoro-1,3-dithietane.

7. The process of preparing a compound of claim 1 which comprises oxidizing a compound of the formula

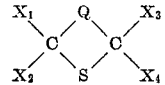

wherein $X_1$, $X_2$, $X_3$, $X_4$ and Q are as defined in claim 1, by contacting the same with a mixture of chromium trioxide and yellow fuming nitric acid at a temperature of 15–200° C.

8. The process of preparing perfluoro-1,1-dioxo-1,4-dithiane which comprises oxidizing perfluoro-1,4-dithiane by contacting the same with a mixture of chromium trioxide and yellow fuming nitric acid at a temperature of 15–200° C.

9. The process of preparing 1,1-dioxo-2,2,4,4-tetrakis (trifluoromethyl)-1,3-dithietane which comprises oxidizing 2,2,4,4-tetrakis(trifluoromethyl)-1,3-dithietane by contacting the same with a mixture of chromium trioxide and yellow fuming nitric acid at a temperature of 15–200° C.

10. The process of preparing 1,1-dioxo-2,4-bis(chlorodifluoromethyl)-2,4-difluoro - 1,3 - dithietane which comprises oxidizing 2,4 - bis(chlorodifluoromethyl) - 2,4 - difluoro-1,3-dithietane by contacting the same with a mixture of chromium trioxide and yellow fuming nitric acid at a temperature of 15–200° C.

11. The process of preparing 1,1-dioxo-2-chloro-2,4,4-trifluoro-1,3-dithietane which comprises oxidizing chlorotrifluoro-1,3-dithietane by contacting the same with a mixture of chromium trioxide and yellow fuming nitric acid at a temperature of 15–200° C.

12. The process of preparing 1,1-dioxo-2,2,4,4-tetrafluoro-1,3-dithietane which comprises oxidizing 2,2,4,4-tetrafluoro-1,3-dithietane by contacting the same with a mixture of chromium trioxide and yellow fuming nitric acid at a temperature of 15–200° C.

References Cited in the file of this patent

UNITED STATES PATENTS 2,939,871    Pyne et al. _____ June 7, 1960

OTHER REFERENCES

Karrer: Organic Chemistry, 4th Ed. (1950), page 123.